Sept. 11, 1962     H. W. WELSH     3,053,505
PINNED BLADE SHROUDING

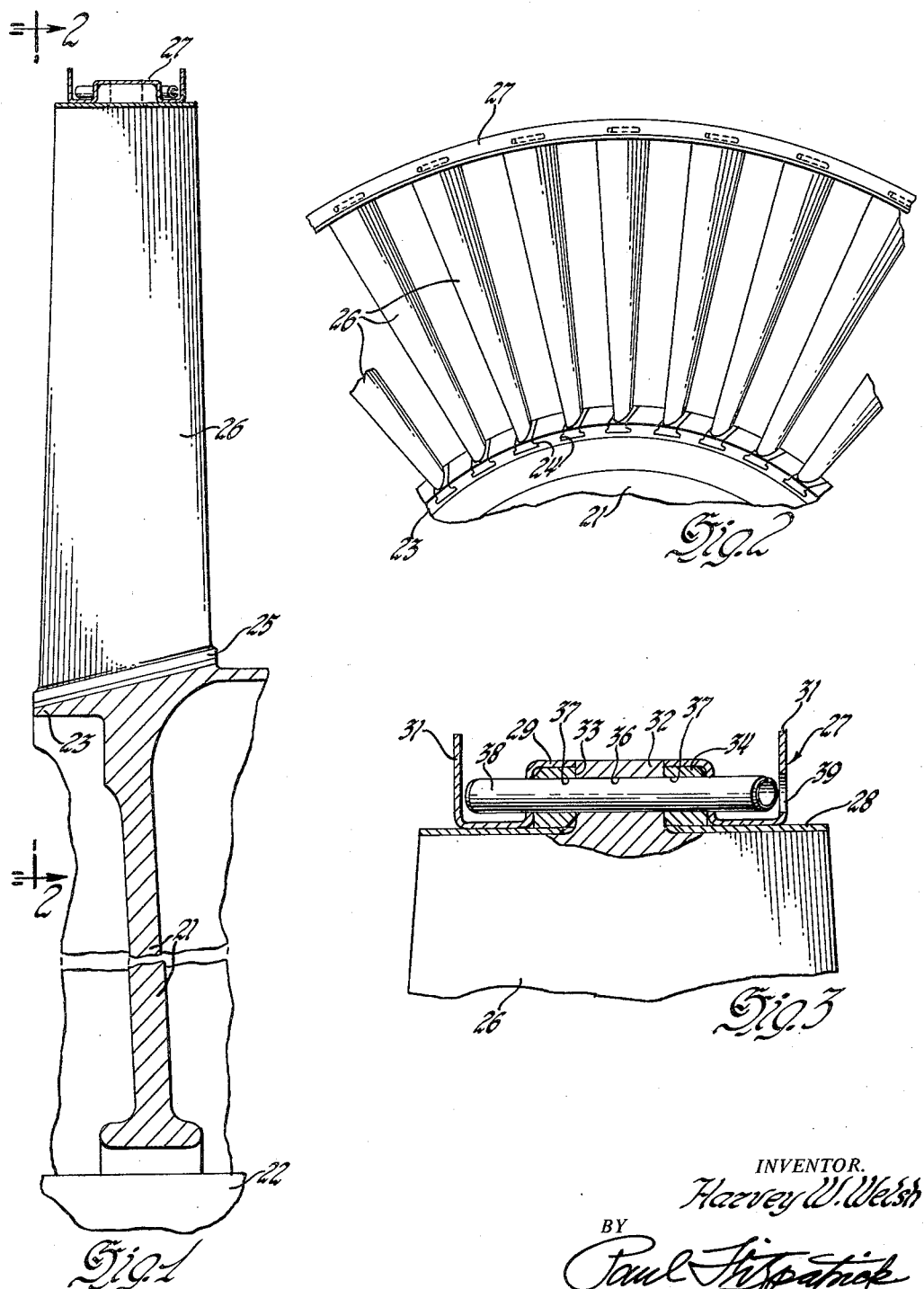

Filed June 11, 1958     5 Sheets-Sheet 2

INVENTOR.
Harvey W. Welsh
BY Paul Fitzpatrick
ATTORNEY

INVENTOR.
Harvey W. Welsh
BY Paul Fitzpatrick
ATTORNEY

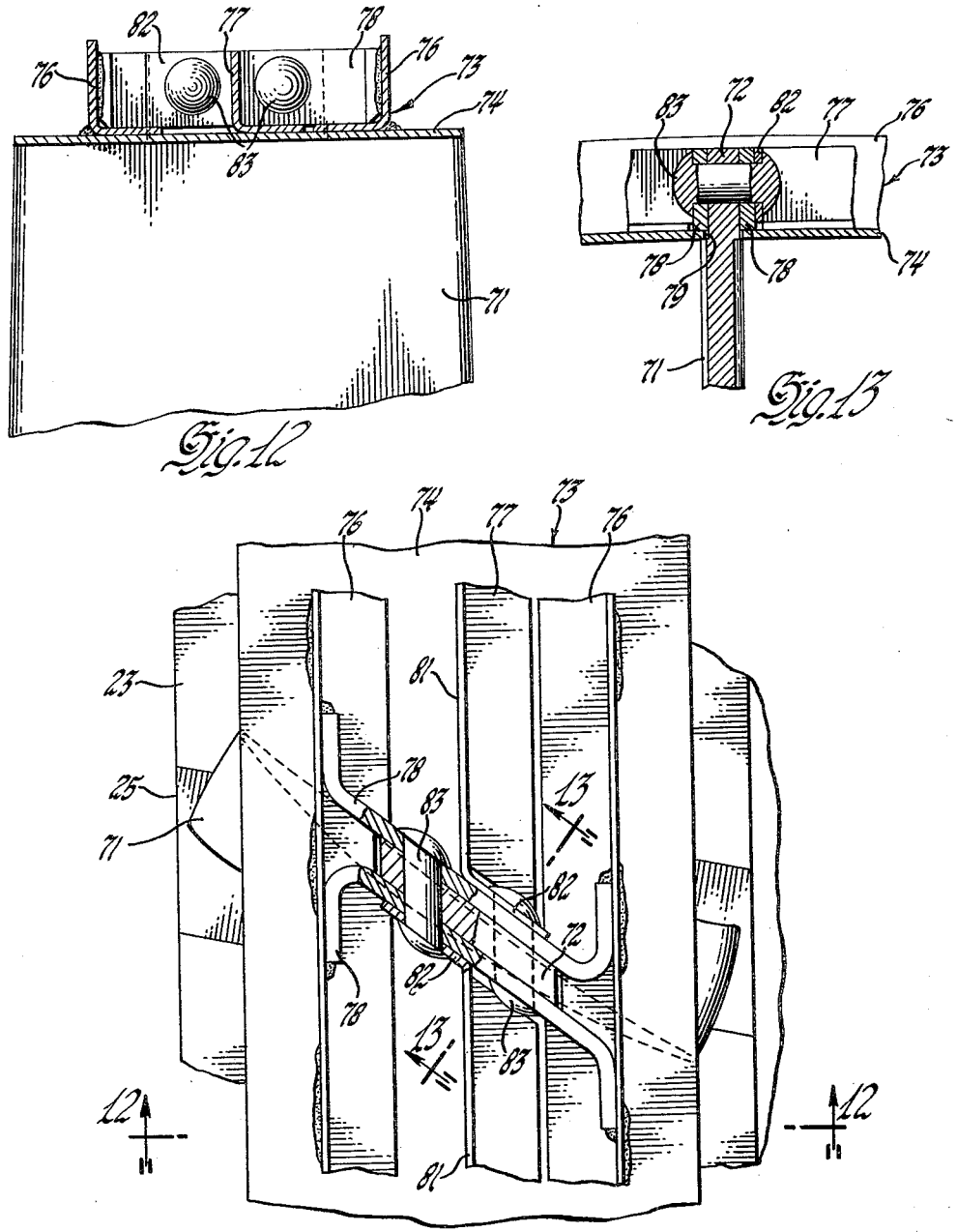

Sept. 11, 1962 H. W. WELSH 3,053,505
PINNED BLADE SHROUDING
Filed June 11, 1958 5 Sheets-Sheet 5

INVENTOR.
Harvey W. Welsh
BY
Paul Fitzpatrick
ATTORNEY

United States Patent Office 3,053,505
Patented Sept. 11, 1962

3,053,505
PINNED BLADE SHROUDING
Harvey W. Welsh, Indianapolis, Ind., assignor to General Motors Corporation, Detroit, Mich., a corporation of Delaware
Filed June 11, 1958, Ser. No. 741,351
9 Claims. (Cl. 253—77)

My invention relates to the rotors of turbomachines, particularly axial flow compressors, and more specifically to an improved shrouded rotor structure.

It is known that the efficiency of axial flow compressors may be improved by providing a shroud ring extending around the outer ends or tips of the rotor blades. The provision of such a shroud involves considerable difficulty, particularly with rotors of large diameter having long blades. In such a case, the tips of the blades are rather widely spaced and, since the structure rotates at high speed, the centrifugal force on the shroud is quite high. It is particularly important, in some cases, to keep the structure of the compressor as light as possible and if the shroud is heavy, it not only contributes unnecessary weight directly but may require a heavier disk to withstand the centrifugal force.

It is also important that the shroud structure be such that the blades may be removed individually from the rotor in case of damage to a blade. The present invention provides a lightweight shroud structure which is easily attached to and removed from the blades and which is strong and secure.

The structure is similar in some respects to those described in my copending U.S. patent applications Serial No. 673,055, filed July 15, 1957 (Patent No. 2,963,272), and Serial No. 678,090, filed August 14, 1957 (Patent No. 2,971,743), in that the shroud is a light-weight but rigid structure made of sheet metal. The present invention differs significantly from those of the prior applications, however, in that the shroud is a continuous ring rather than a segmented construction and in the different mode of attachment of the shroud to the blades.

The principal objects of the invention are to improve the performance of turbomachines such as compressors, and to provide an improved shrouded rotor structure. The invention is described herein in terms of several embodiments in axial flow compressors, to illustrate the principles thereof.

The nature of the invention and the advantages thereof will be clear to those skilled in the art from the succeeding detailed description of preferred embodiments of the invention and the accompanying drawings thereof.

FIGURE 1 is a partial sectional view of a compressor rotor embodying the invention, the section being taken on a plane containing the axis of the compressor.

FIGURE 2 is a partial front elevation view of the same taken on the plane indicated by the line 2—2 in FIGURE 1.

FIGURE 3 is a fragmentary sectional view of the same taken on the plane indicated by the line 3—3 in FIGURE 4.

FIGURE 12 is a fragmentary sectional view of a third form of the invention taken on the plane indicated by the line 12—12 in FIGURE 14.

FIGURE 13 is a fragmentary sectional view taken on the plane indicated by the line 13—13 in FIGURE 14.

FIGURE 14 is a fragmentary plan view with parts cut away and in section.

Figure 4:
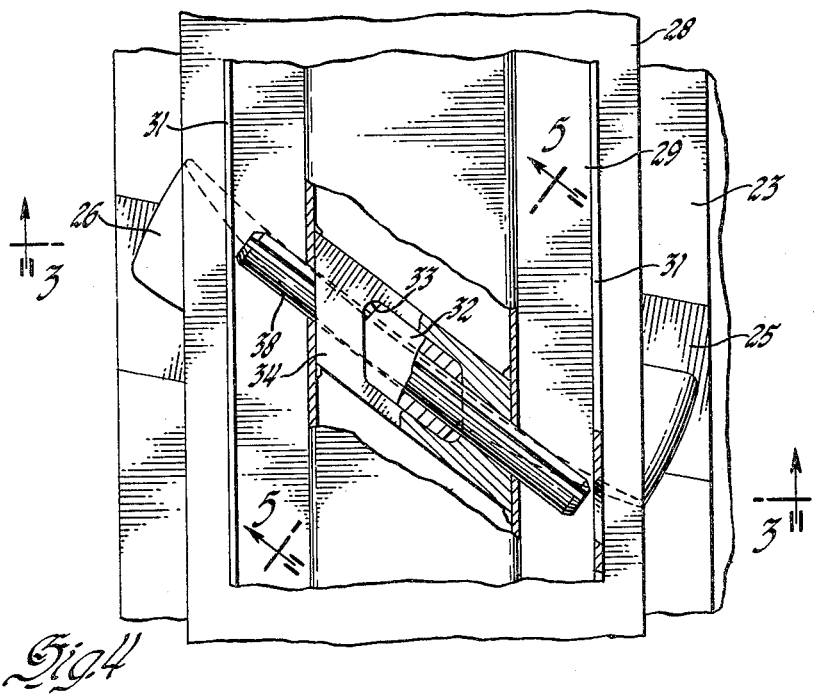
FIGURE 4 is a fragmentary plan view of the same.
Figure 5:
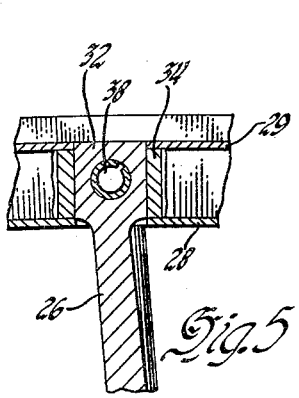
FIGURE 5 is a fragmentary sectional view taken on the plane indicated by the line 5—5 in FIGURE 4.

Referring first to FIGURES 1 to 5 for a description of the first form of the invention, it may be pointed out that the shroud structure may be employed with various rotor configurations, that shown being merely illustrative of one form of rotor structure. The rotor may comprise any number of disks 21 which may be suitably connected to shaft or tie bolt 22 by means not illustrated. The rim or flange 23 of the disk is provided with dovetail slots 24 around the periphery, within which are mounted the dovetail roots 25 of suitable blades 26, which normally are of a twisted airfoil shape. A ring of blades 26 mounted on a disk 21, or equivalent rotor structure, comprises one rotor stage of the machine.

A continuous fabricated sheet metal shroud ring 27 extends around the tips of the blades. Preferably this ring is a lightweight fabricated sheet metal construction consisting principally of a flat circular inner band 28 and an outer band 29, which is generally W shaped in cross section and is spot welded or brazed to the band 28. As will be apparent, the two rings provide a light but relatively rigid sheet metal shroud, the outwardly extending flanges 31 of which may constitute members of a labyrinth seal in cooperation with the compressor case (not shown).

A tang 32 integral with the blade extends from the tip of each blade through a mating opening 33 in the shroud ring. As will be apparent from FIGURE 4, both the tang 32 and the opening 33 are approximately of a rhombic shape because of the inclination of the blade chord to the axis.

The shroud ring also includes, at each blade position, an attaching member or block 34 mounted between the rings 28 and 29 to provide an attaching structure of relatively heavy section and thus of sufficient strength to provide for proper attachment of the shroud to the blade. The member 34 is a rhombic shaped block extending across the space between the inner radial webs of the ring 29 and brazed to the rings 28 and 29.

Hole 36 is bored through the tang 32 and holes 37 through the ends of the member 34 coaxial with the hole 36. These holes receive a rollpin 38 which extends through the holes. An opening 39 in one of the flanges 31 provides for insertion of the rollpin.

It will be apparent that this structure provides a very firm attachment of the shroud to the blades which is easily assembled or disassembled. To assemle the structure, the blades may be slid into the slots in the disk and at the same time the tangs of the blades move outwardly into the openings 33 in the shroud ring. When the blades are all in place, the pins 38 are inserted. Rollpins inherently tend to remain in place and the pins are so disposed that the centrifugal force on them does not tend to move them out of the holes. Similarly, to disassemble the structure, the rollpins may be pushed part way out and pulled the rest of the way out of the hole, and then the blades may be slid off the disks and out of the shroud ring. It will be noted that the wheel rim illustrated is conical and the blade dovetails incline to the rotor axis. If the blade dovetail is at a constant distance from the axis, it is possible to mount the blades in the shroud ring before they are slid into the rotor.

Figure 6:
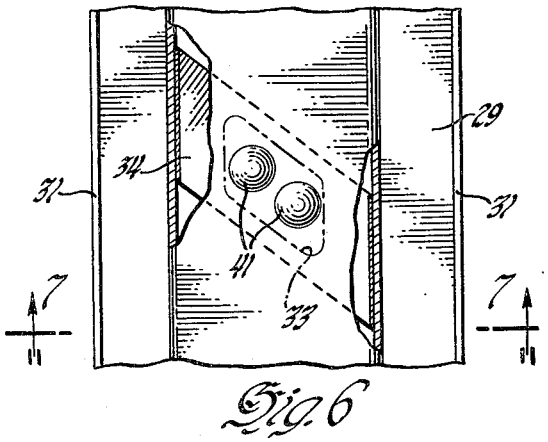
FIGURE 6 is a fragmentary plan view of the shroud in an intermediate stage of fabrication.
Figure 7:
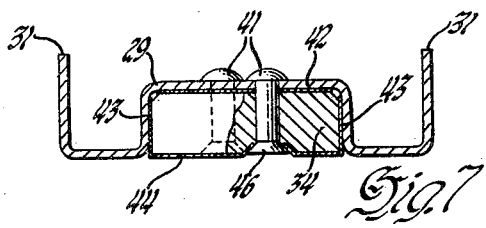
FIGURE 7 is a sectional view with parts broken away, taken on the plane indicated by the line 7—7 in FIGURE 6.
Figure 8:
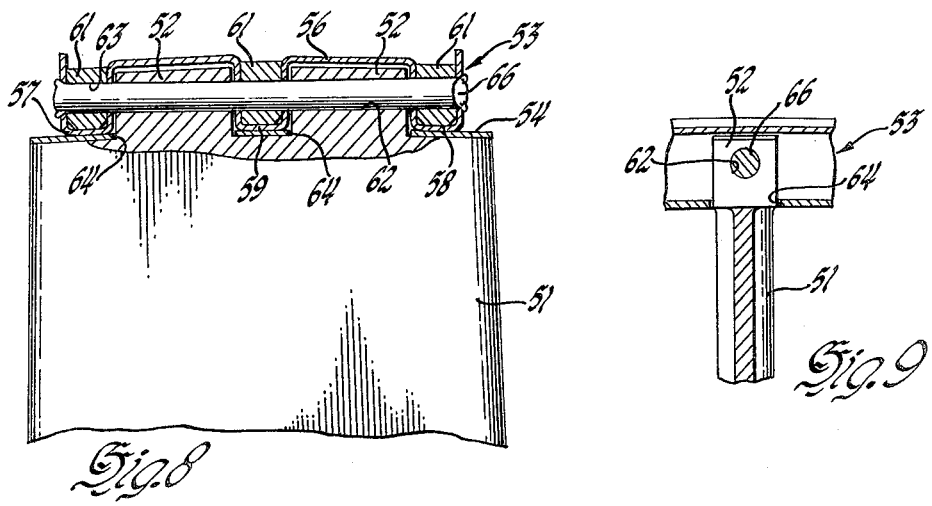
FIGURE 8 is a fragmentary sectional view of a second form of the invention taken on the plane indicated by the line 8—8 in FIGURE 10.
Figure 9:
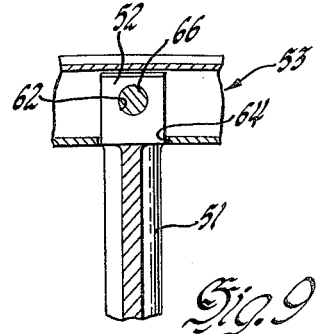
FIGURE 9 is a fragmentary sectional view taken on the plane indicated by the line 9—9 in FIGURE 10.
Figure 10:
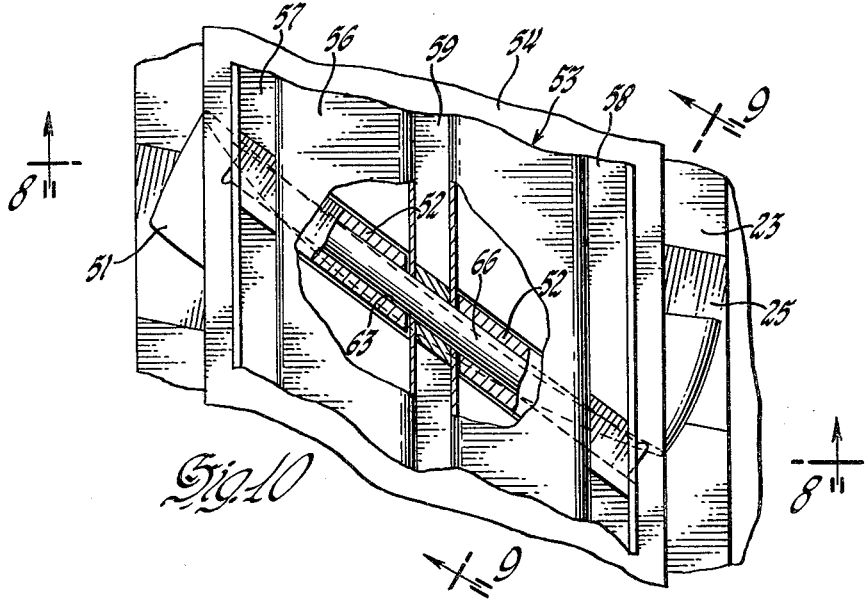
FIGURE 10 is a partial plan view with parts cut away.
Figure 11:
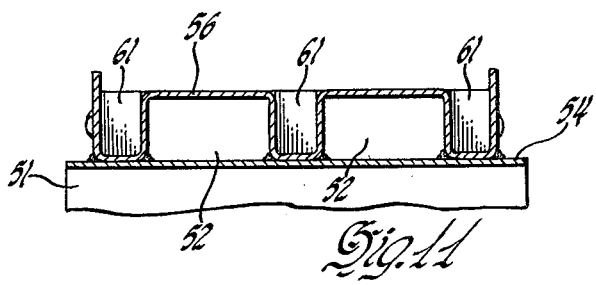
FIGURE 11 is a fragmentary sectional view of the same taken on a plane containing the axis of the rotor.

FIGURES 6 and 7 illustrate the fabrication of the shroud ring of FIGURES 1 to 5. The member 34 is held in place in the outer ring 29 by rivets 41 and thin sheets 42 and 43 of braze shim stock are held between the member 34 and the ring 29. A sheet 44 of braze shim stock may be held by the countersunk heads 46 of the rivets. The ring 28 may then be put in place, and when the structure is heated the braze metal melts and bonds the block or member 34 to the rings 28 and 29. The opening 33 shown in broken lines in FIGURE 6 may then be provided by drilling and broaching, which removes the rivets 41.

FIGURES 8 to 11 depict a second embodiment of the invention similar in principle to that previously described. In this form, the blade 51 may be similar in shape and mounting to that previously described, but has two spaced tangs 52 at its tip. The shroud 53 is composed of an inner flat band or ring 54 and an outer ring 56. The outer ring is formed with two channels 57 and 58 at the edges of the ring and a channel 59 halfway between the edges. Three attaching members in the form of small rhombic blocks 61 are brazed within the three channels 57, 58 and 59 and the rings 54 and 56 are brazed or welded together. A hole 62 is drilled through the tangs 52 and a hole 63 is drilled through the webs of the three channels and through the three members 61, these holes being aligned when the shroud is attached to the blades. Openings 64 are provided in the ring 54 through which the tangs project. A pin 66 is inserted through the coaxial holes 62 and 63 to attach the shroud ring to each blade. The pin may be retained by any suitable means. As illustrated, it is peened to provide a small shoulder at each end of the pin. The rotor structure of this form is assembled in the same manner as that previously described.

The third embodiment of the invention is illustrated in FIGURES 12 to 14. The blade 71 includes a foot 25 mounted in the rim 23 of the rotor as previously described. A single tang 72 extends from the end of the blade. The shroud ring 73 comprises a flat inner ring or band 74, two rings 76 of L-shaped cross section which extend through the entire 360 degrees, and an intermediate ring 77 of L-shaped cross section, which is in segments extending from blade to blade; that is, there are as many segments of the ring 77 as there are blades. The rings 76 and 77 are welded or brazed to the ring 74. The attaching member on the shroud in this form consists of two metal strips 78 of material of considerably thicker section than the rings 74, 76 and 77. Members 78 are disposed on each side of the blade tang 72 and are brazed to the outstanding webs or flanges of the rings 76. The blade tang extends through an opening 79 in the band 74. The webs 81 of the segment 77 extend beyond the base of the segment, are bent as indicated at 82 to lie against the member 78, and may be brazed thereto.

Holes are drilled or bored through the portions 82, the members 78, and the tang 72 to receive two pins 83 which may specifically be rivets, as illustrated, or any other suitable pin.

In this form of the invention, the assembly is similar to those previously described except that the attachment of the shroud to the blade is effected by inserting and heading the pins or rivets 83.

Figure 15:
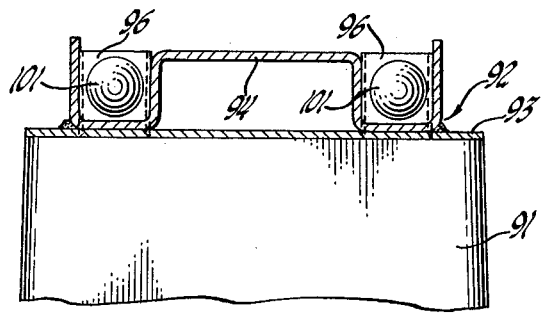
FIGURE 15 is a fragmentary sectional view of a fourth form of the invention taken on the plane indicated by the line 15—15 in FIGURE 17.
Figure 16:
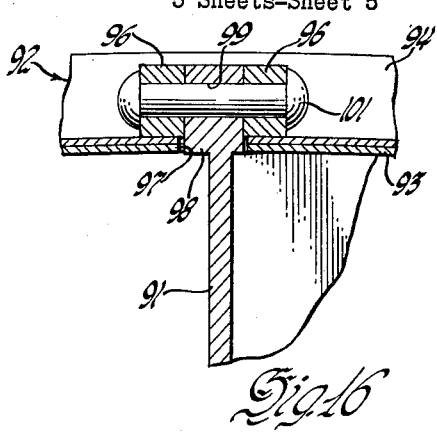
FIGURE 16 is a fragmentary sectional view taken on the plane indicated by the line 16—16 in FIGURE 17.
Figure 17:
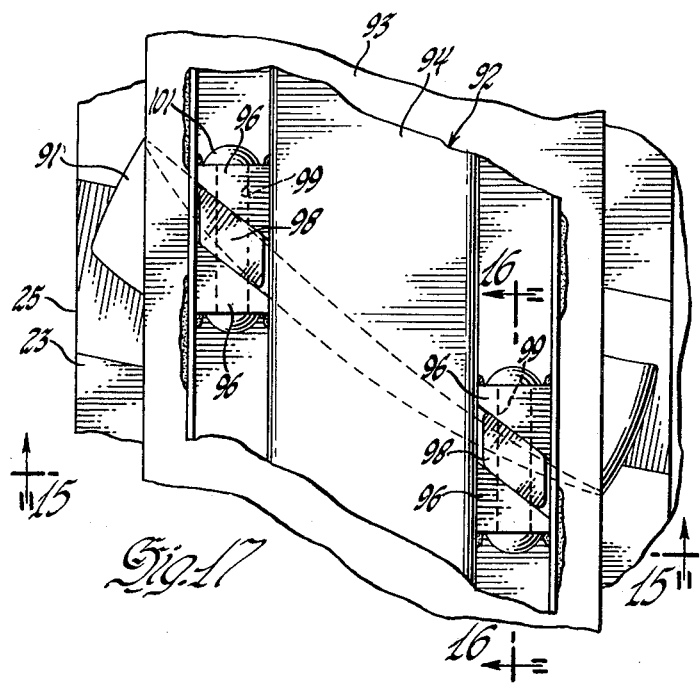
FIGURE 17 is a partial plan view.

The fourth embodiment of the invention is illustrated in three slightly varying forms in FIGURES 15 to 20. Referring first to FIGURES 15 to 17, the blade 91 is mounted as previously described by its root 24 in the rim 23 of the disk of the rotor. The shroud 92 is similar to that of the first form described in that it comprises a flat continuous inner band 93 and a generally W section outer band 94 brazed or welded together. The retaining members are defined by small wedge-shaped blocks 96, two such blocks being welded or brazed between the webs of the outer band on each side of two openings 97 through the rings 93 and 94. Tangs 98 near the leading and trailing edge of the blade project through the openings 97 into the spaces between the blocks 96. Holes 99 are drilled or bored through the blocks 96 and tangs 98, and the shroud ring is held on the blades by pins extending through the holes 99. In the variety shown in FIGURES 15 to 17, the pins 101 are headed and may be regarded as rivets.

Figure 18:
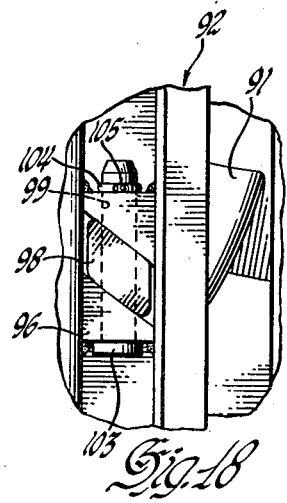
FIGURE 18 is a fragmentary plan view illustrating a modification of the structure of FIGURES 15 to 17.

The structure shown in FIGURE 18 is identical to that of FIGURES 15 to 17 except that the pin is a headed pin 103 inserted into the hole 99 and retained by a contracting snap ring 104 mounted in a groove 105 in the pin.

Figure 19:
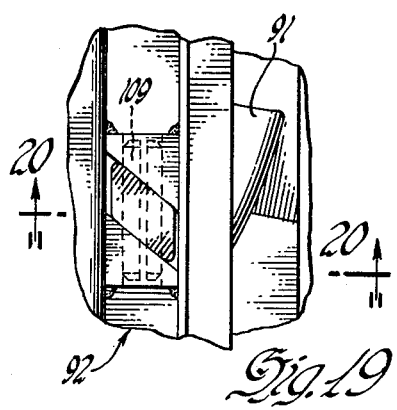
FIGURE 19 is a fragmentary plan view illustrating a further modification of the structure of FIGURES 15 to 17.
Figure 20:
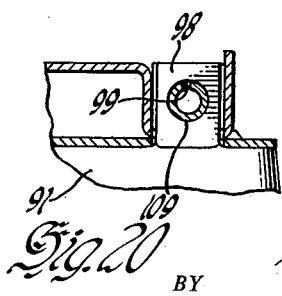
FIGURE 20 is a fragmentary sectional view taken on the plane indicated by the line 20—20 in FIGURE 19.

In the variety shown in FIGURES 19 and 20, a rollpin 109 is inserted in the hole 99 and is retained by virtue of its resilience.

The several types of pins illustrated in FIGURES 17 to 20 may be employed in the other species of the invention, as may any suitable pin or equivalent. The rollpin and the pin with the snap ring are more advantageous in some respects than the headed pin or rivet with respect to ease of application and removability.

It will be apparent to those skilled in the art from the foregoing that the invention in any of its several embodiments is particularly well suited to meet the requirements of providing a strongly secured but readily removable rotor blade shroud.

The detailed description of the preferred embodiments of the invention for the purpose of explaining the principles thereof is not to be considered as limiting the invention, as many modifications may be made by the exercise of skill in the art.

I claim:

1. A shrouded turbomachine rotor structure comprising, in combination, a rotor, a ring of blades extending from the rotor, a shroud ring structure including a ring having channels therein and mounted on the tips of the blades, and means for attaching the shroud ring to the blades, the attaching means comprising block members of substantially heavier section than the shroud ring fixed to the shroud ring within a plurality of said channels at each blade position, each member having a hole therethrough extending substantially chordwise of the blade, at least one tang integral with each blade and extending therefrom, the tang having a hole therethrough extending substantially chordwise of the blade and coaxial with the holes in the adjacent members, and pins extending through the coaxial holes in the members and tangs.

2. A rotor structure as recited in claim 1 in which the shroud ring comprises two abutting rings defining an annular space between them and the block members are mounted between the rings.

3. A shrouded turbomachine rotor structure comprising, in combination, a rotor, a ring of blades extending from the rotor, a continuous 360° lightweight sheet metal shroud ring structure including a ring having channels therein and mounted on the tips of the blades, and means for attaching the shroud ring to the blades, the attaching means comprising block members of substantially heavier section than the sheet metal shroud ring fixed to the shroud ring within the channels at each blade position, the member having a hole directed substantially tangentially to the shroud ring extending therethrough, at least one tang integral with each blade and extending therefrom, the tang having a hole therethrough coaxial with the hole in the adjacent member, and pins extending through the coaxial holes in the members and tangs.

4. A rotor structure as recited in claim 3 in which the shroud ring comprises two abutting rings defining an annular space between them and the block members are mounted between the rings.

5. A rotor structure as recited in claim 3 in which the pins are rollpins.

6. A shrouded turbomachine rotor structure comprising, in combination, a rotor, a ring of blades extending from the rotor, a shroud ring mounted on the tips of the blades, and means for attaching the shroud ring to the blades; the shroud ring comprising an inner substantially flat sheet metal ring and an outer sheet metal ring defining at least two outwardly-open channels, the inner and outer rings being fixed together to provide a unitary shroud ring, and at least two mutually aligned blocks fixed within the channels of the outer ring at each blade position, the blocks having coaxial holes therethrough, the inner ring having openings therethrough at each blade position between the channels and aligned with the blocks; each blade having at least one tang integral therewith and extending therefrom through a said opening between the blocks, the tangs having holes therethrough coaxial with the holes in the blocks; and a pin securing the shroud ring to each blade, the pins extending through the coaxial holes in the blocks and tangs.

7. A shrouded turbomachine rotor structure comprising, in combination, a rotor, a ring of blades extending from the rotor, a shroud ring mounted on the tips of the blades, and means for attaching the shroud ring to the blades; the shroud ring comprising an inner substantially flat sheet metal ring and an outer sheet metal ring defining three outwardly-open channels, the inner and outer rings being continuous and being fixed together to provide a unitary shroud ring, and three mutually aligned blocks fixed within the channels of the outer ring at each blade position, the blocks having coaxial holes therethrough, the inner ring having openings therethrough at each blade position between the channels and aligned with the blocks; each blade having two tangs integral therewith and extending therefrom through the openings between the blocks, the tangs having holes therethrough coaxial with the holes in the blocks; and a pin securing the shroud ring to each blade, the pin extending through the coaxial holes in the blocks and tangs.

8. A shrouded turbomachine rotor structure comprising, in combination, a rotor, a ring of blades extending from the rotor, a shroud ring mounted on the tips of the blades, and means for attaching the shroud ring to the blades; the shroud ring comprising an inner substantially flat sheet metal ring and an outer sheet metal ring defining outwardly-open channels, the inner and outer rings being continuous and being fixed together to provide a unitary shroud ring, and mutually aligned blocks fixed within the channels of the outer ring at each blade position, the blocks having coaxial holes therethrough, the inner ring having openings therethrough at each blade position aligned with the blocks; each blade having two tangs integral therewith and extending therefrom through the openings between the blocks, the tangs having holes therethrough coaxial with the holes in the blocks; and pin means securing the shroud ring to each blade, the pin means extending through the coaxial holes in the blocks and tangs.

9. A shrouded turbomachine rotor structure comprising, in combination, a rotor, a ring of blades extending from the rotor, a continuous 360° lightweight sheet metal shroud ring mounted on the tips of the blades, the shroud ring comprising a band, two continuous L-shaped stiffeners fixed thereon, and a segmented L-shaped stiffener fixed thereon between the continuous stiffeners, and means for attaching the shroud ring to the blades, the attaching means comprising a member of substantially heavier section than the sheet metal shroud ring extending between and fixed to the continuous stiffeners at each blade position, the member being attached to the ends of the segmented stiffeners and having a hole therethrough directed substantially tangentially to the shroud ring, at least one tang integral with each blade and extending therefrom, the tang having a hole therethrough coaxial with the hole in the adjacent member, and pins extending through the holes in the members and tangs, the pins being substantially perpendicular to the radial direction.

References Cited in the file of this patent

UNITED STATES PATENTS

| | | |
|---|---|---|
| 784,670 | Fullagar | Mar. 14, 1905 |
| 1,010,750 | Green | Dec. 5, 1911 |
| 1,298,524 | London | Mar. 25, 1919 |
| 1,457,404 | Snyder | June 5, 1923 |
| 1,720,754 | Baumann | July 16, 1929 |
| 1,998,951 | Downer | Apr. 23, 1935 |
| 2,812,159 | Krebs | Nov. 5, 1957 |
| 2,912,222 | Wilkes | Nov. 10, 1959 |

FOREIGN PATENTS

| | | |
|---|---|---|
| 766,839 | Great Britain | Jan. 23, 1957 |